United States Patent
Tsai et al.

(10) Patent No.: US 8,246,366 B2
(45) Date of Patent: Aug. 21, 2012

(54) ELECTRICAL CARD CONNECTOR WITH A STOP MEMBER FOR TEMPORARILY PREVENTING A CARD FROM EJECTING FROM THE CARD RELEASE POSITION

(75) Inventors: Tzu-Ching Tsai, New Taipei (TW); Kai-Li Wang, New Taipei (TW)

(73) Assignee: Hon Hai Precision Ind. Co., Ltd., New Taipei (TW)

( * ) Notice: Subject to any disclaimer, the term of this patent is extended or adjusted under 35 U.S.C. 154(b) by 0 days.

(21) Appl. No.: 13/036,055

(22) Filed: Feb. 28, 2011

(65) Prior Publication Data
US 2011/0212636 A1    Sep. 1, 2011

(30) Foreign Application Priority Data
Mar. 1, 2010 (TW) .................................. 99203615

(51) Int. Cl.
*H01R 13/62* (2006.01)
(52) U.S. Cl. ...................................................... 439/159
(58) Field of Classification Search .................. 439/159, 439/160, 188, 267, 328
See application file for complete search history.

(56) References Cited

U.S. PATENT DOCUMENTS

| 6,773,280 B2 * | 8/2004 | Sasaki et al. ................... 439/159 |
| 6,776,632 B2 | 8/2004 | Kikuchi et al. |
| 7,381,094 B2 | 6/2008 | Miyao et al. |
| 2002/0008142 A1 * | 1/2002 | Takayasu et al. ............. 235/441 |
| 2004/0106315 A1 * | 6/2004 | Murayama et al. ........... 439/188 |
| 2007/0249202 A1 * | 10/2007 | Ting .............................. 439/159 |
| 2009/0298316 A1 * | 12/2009 | Maruyama .................... 439/267 |

FOREIGN PATENT DOCUMENTS
TW    M367466    10/2009
\* cited by examiner

*Primary Examiner* — Chandrika Prasad
(74) *Attorney, Agent, or Firm* — Ming Chieh Chang; Wei Te Chung; Andrew C. Cheng

(57) ABSTRACT

An electrical card connector includes an insulative housing, a number of contacts and a push-push mechanism. The push-push mechanism includes a slider, an elastic member for driving the slider and a locking arm fixed to the slider. The locking arm includes a hook protruding into a card receiving space for locking with the card when the card is fully inserted into the card receiving space at a card locking position. When the card is ejected under a normal speed, the locking arm can be outwardly deformed to disengage from the card at a card release position. When the card is ejected under an abnormal speed faster than the normal speed, the slider gets over the card release position where the locking arm is restricted by a stop member to prevent the hook from releasing the card.

20 Claims, 9 Drawing Sheets

ELECTRICAL CARD CONNECTOR WITH A STOP MEMBER FOR TEMPORARILY PREVENTING A CARD FROM EJECTING FROM THE CARD RELEASE POSITION

BACKGROUND OF THE INVENTION

1. Field of the Invention

The present invention relates to an electrical card connector, and more particularly to an electrical card connector with a stop member to prevent a card from flying off the card connector when the card is ejected under an abnormal fast speed.

2. Description of Related Art

Electrical card connectors are usually mounted on PCBs of the electronic devices to establish data transmission between the cards and the electronic devices. Usually, an electrical card connector sets a locking arm for holding the inserted electrical card in locking position. U.S. Pat. No. 6,776,632 issued to Kikuchi et al. on Aug. 14, 2004 discloses a conventional electrical card connector including an insulative housing, a plurality of contacts fixed in the insulative housing and a push-push mechanism. The push-push mechanism includes a slider moveable along the card insertion direction and a locking arm retained on the slider. When a corresponding card is inserted into the card connector, a hook of the locking arm is deformable to recede into a notch of the card in order to preliminarily hold the card. With further insertion of the card to reach the final locking position, contact pads of the card abut against the contacts to establish electrical and mechanical connection. Under this condition, the electrical card is held only via the hook abutting against the notch of the card. Since there is no other structure resisting and restricting deformation of the locking arm, the hook may easily withdraw from the notch of the card by certain external force. As a result, the card may be easily pulled out from the electrical card connector, resulting in error operations or even breakage of the card.

Besides, in order to avoid the card from flying off the electrical card connector during ejecting, some card connectors employ locking pieces for engaging with the card. Taiwan Patent No. M367466 issued on Oct. 21, 2009 discloses such a card connector which includes a cantilevered locking clip adjacent to a card insertion opening. However, since there is no protection wall for outwardly supporting/restricting the locking clip, the locking clip might be easily crushed by the card when it is ejected rapidly from the card connector.

Hence, an electrical card connector with a stop member for supporting a locking arm in order to jointly prevent a card from flying off the card connector is desired.

BRIEF SUMMARY OF THE INVENTION

The present invention provides an electrical card connector including an insulative housing, a plurality of contacts retained in the insulative housing and a push-push mechanism. The insulative housing defines a card receiving space and a side wall located at a lateral side of the card receiving space. Each contact has a contacting portion extending into the card receiving space for mating with a card. The push-push mechanism includes a slider slidably mounted in a first slot of the side wall along a card extraction direction, an elastic member received in the first slot for driving the slider and a locking arm fixed to the slider. The locking arm includes a hook protruding into the card receiving space. The slider is slidable simultaneously with the card. The hook locks with a notch of the card when the card is fully inserted into the card receiving space at a card locking position. When the card is ejected under a normal speed, the locking arm can be outwardly deformed to disengage the hook from the notch at a card release position. However, when the card is ejected under an abnormal speed faster than the normal speed, the slider gets over the card release position where the locking arm is restricted by a stop member to prevent the hook from releasing the card. As a result, the card can be prevented from flying off the electrical card connector.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE PREFERRED EMBODIMENTS

Figure 1:
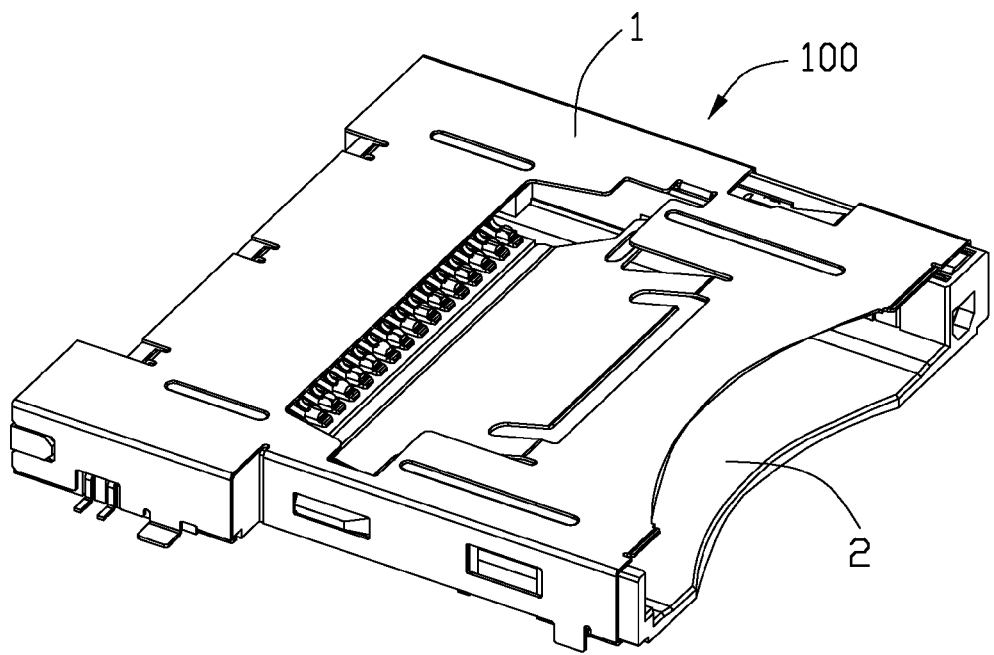
FIG. 1 is a perspective view of an electrical card connector in accordance with a preferred embodiment of the present invention.
Figure 2:
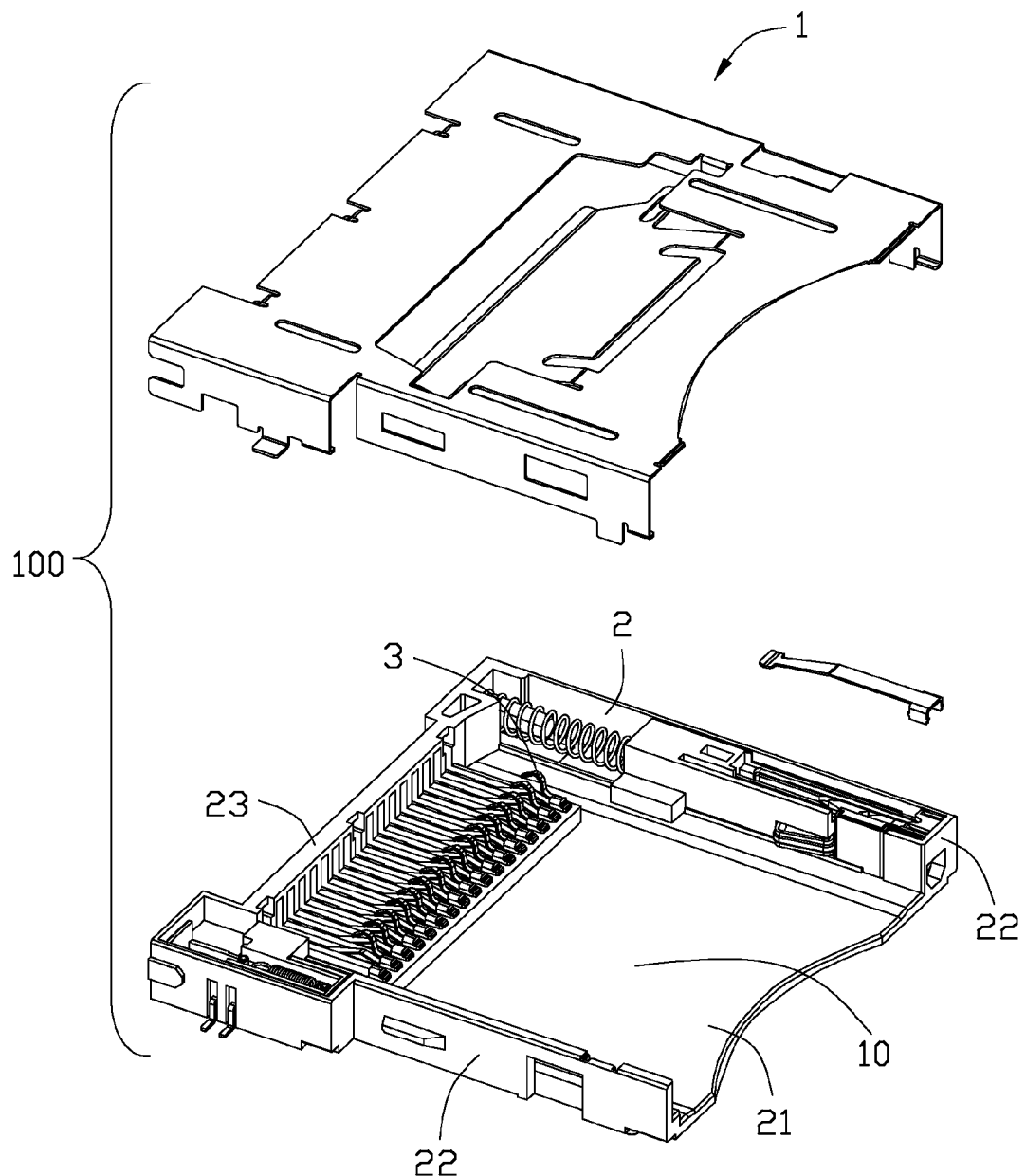
FIG. 2 is an exploded view of the electrical card connector as shown in FIG. 1.

Reference will now be made to the drawing figures to describe the preferred embodiment of the present invention in detail. FIGS. 1 and 2 illustrate an electrical card connector 100 for insertion of a card (shown in FIG. 8). The electrical card connector 100 includes an insulative housing 2, a plurality of contacts 3 retained in the insulative housing 2 for data transmission, a push-push mechanism 24 and a metal cover 1 shielding the insulative housing 2. The metal cover 1 is attached to the insulative housing 2 to form a card receiving space 10 for receiving the card. However, the card receiving space 10 can be formed only by the insulative housing 2.

Figure 3:
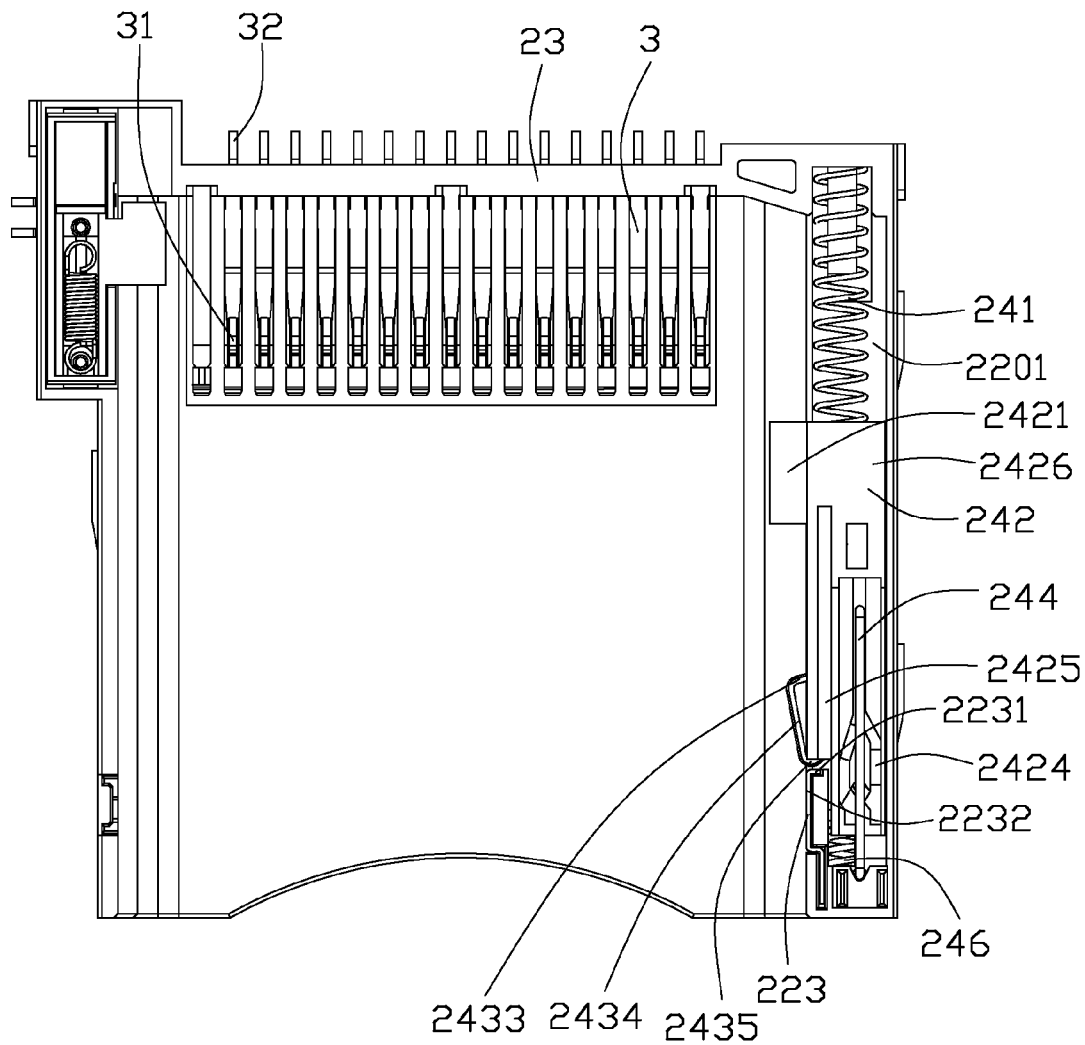
FIG. 3 is a top view of the electrical card connector as shown in FIG. 2, with a metal cover and a press member removed therefrom.

The insulative housing 2 includes a flat bottom wall 21, a pair of left and right sidewalls 22 extending upwardly from opposite lateral sides of the bottom wall 21, and a front wall 23 opposing a card-insertion opening of the card receiving space 10. The right side wall 22 defines a first slot 2201, a second slot 2202 and a third slot 2203 communicating the first slot 2201 and the second slot 2202. The first, the second and the third slots 2201, 2202 and 2203 extend along a card insertion direction or a card extraction direction for mounting the push-push mechanism 24. The third slot 2203 is narrower than either the first slot 2201 or the second slot 2202. The right side wall 22 defines a mounting hole 2206 extending through a rear end thereof and a first opening 2205 extending upwardly through the right side wall 22. Besides, since the third slot 2203 is narrower than the second slot 2202, a front engaging wall 2204 is formed on a joint of the second and the third slots 2202 and 2203 of the right side wall 22. A stop member 222 is integrally formed with the right side wall 22 and is located adjacent to the card receiving space 10. As shown in FIG. 3, according to the preferred embodiment of the present invention, the stop member 222 includes a metal piece 223 in order to improve intensity thereof. The metal piece 223 includes a front portion 2231 and a side portion 2232 bent perpendicular to the front portion 2231 to be exposed to the card receiving space 10 for guiding insertion of the card.

The contacts 3 include contacting portions 31 cantileveredly extending into the card receiving space 10 for mating with the card and tail portions 32 extending forwardly beyond the front wall 23 for being mounted on a print circuit board.

Referring to FIGS. 2 to 1, the push-push mechanism 24, also known as card eject mechanism, includes a first elastic member 241, a slider 242 moveable along the card insertion direction or the card extraction direction, a locking arm 243 fixed to the slider 242, a link rod 244 for controlling positions of the slider 242, and a second elastic member 246. According to the embodiment of the present invention, the first elastic member 241 is a coiled spring and received in the first slot 2201 of the right side wall 22. One end of the first elastic member 241 abuts against the front wall 23 and the other end of the first elastic member 241 engages with the slider 242 in order to drive the slider 242 move along the card extraction direction.

Figure 6:
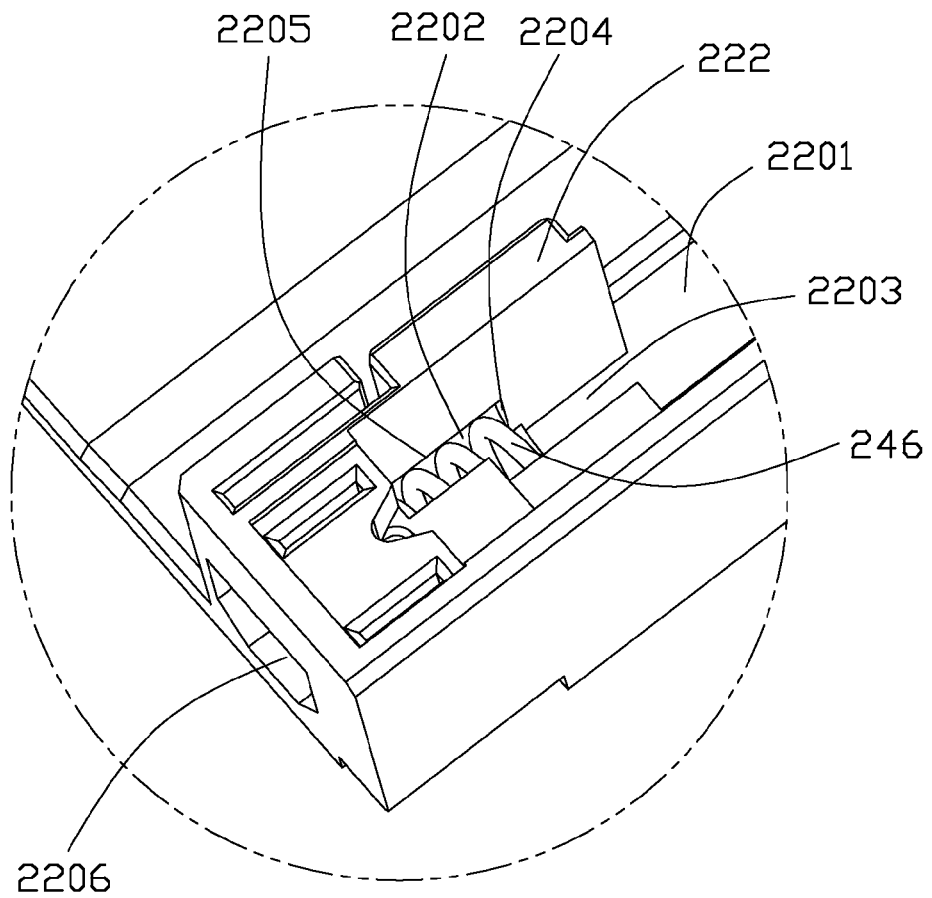
FIG. 6 is an enlarged view of a circle portion as shown in FIG. 5.
Figure 7:
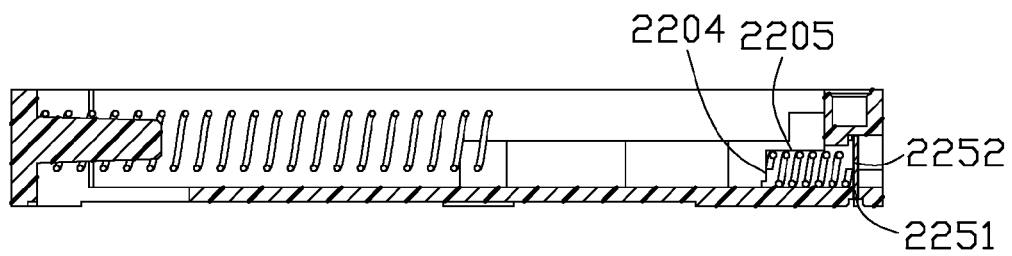
FIG. 7 is a cross-sectional view of the electrical card connector taken along line 7-7 of FIG. 5.

Referring to FIGS. 6 and 7, the second elastic member 246 is a coiled spring and is inserted through the mounting hole 2206 to be received in the second slot 2202 of the right side wall 22. One end of the second elastic member 246 resist against the front engaging wall 2204 and the other end of the second elastic member 246 is limited by a positioning clip 2252 which is inserted in a positioning slit 2251 along a vertical direction. Since the first opening 2205 is narrower than the second slot 2202, the second elastic member 246 can be prevented from jumping out from the second slot 2202. The second elastic member 246 is exposed to the third slot 2203. However, in an alternative embodiment, the second elastic member 246 can be received in the second slot 2202 along a vertical direction and pressed by a restricting member to limit movement thereof along the vertical direction.

Figure 4:
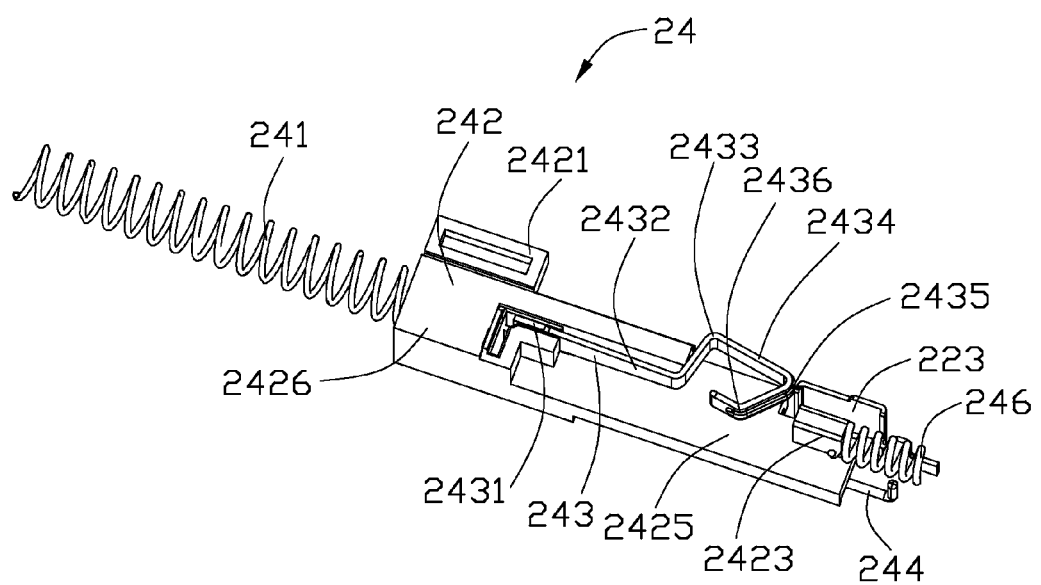
FIG. 4 is a perspective view of a push-push mechanism of the electrical card connector.
Figure 5:
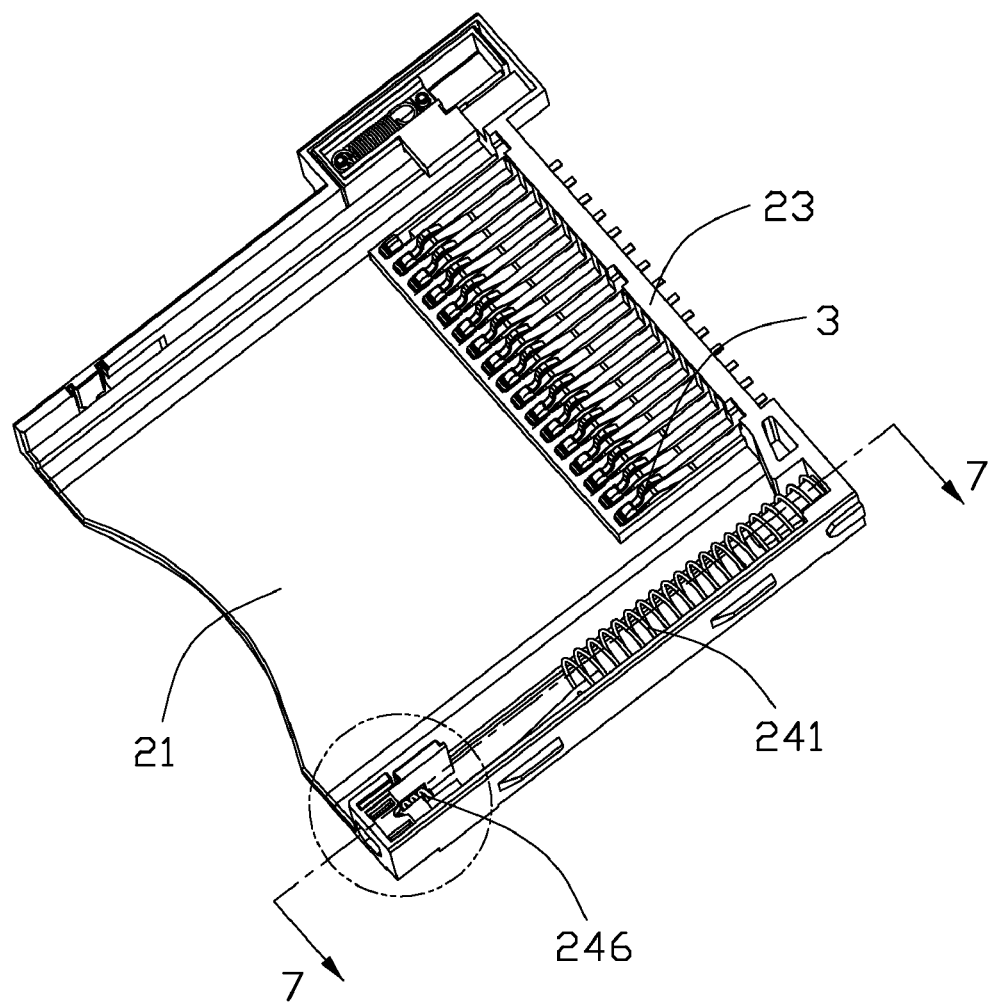
FIG. 5 is a partly perspective view of the electrical card connector showing first and second elastic members residing in a side wall of an insulative housing.

Referring to FIG. 4, the locking arm 243 includes a retaining portion 2431 fixed to the slider 242, a hook 2433 protruding into the card receiving space 10 for locking the card, a connecting portion 2432 connecting the retaining portion 2431 and the hook 2433, an inclined guiding portion 2434 extending backwardly from the hook 2433 for guiding insertion of the card, and a support portion 2436 bent outwardly and forwardly from the guiding portion 2434. The guiding portion 2434 further includes an engaging portion 2435 formed at a distal end thereof and located on a rearmost end of the locking arm 243 for abutting against the stop member 222.

The slider 242 includes a front thicker portion 2426 and a rear thinner portion 2425. The retaining portion 2431 of the locking arm 243 is fixed to the front thicker portion 2426. The rear thinner portion 2425 includes a heart-shaped cam 2424 formed on a top side thereof. As shown in FIG. 3, one end of the link rod 244 is retained in the right side wall 22 and the other end is movable in the heart-shaped cam 2424 to realize push-push theory which is well-known in the art. A central line of the rear thinner portion 2425 is offset from that of the front thicker portion 2426 and is located at a higher level. As a result, a flat space is formed between the front thicker portion 2426 and the right side wall 22 for deformation of the locking arm 243. Besides, the front thicker portion 2426 includes a protrusion 2421 extending into the card receiving space 10 for engaging with the card so that the slider cab be slidable simultaneously with the card. The rear thinner portion 2425 further includes a block 2423 formed on a bottom side thereof. The block 2423 is narrower than the third slot 2203 so as to be moveable into the second slot 2202.

Figure 8:
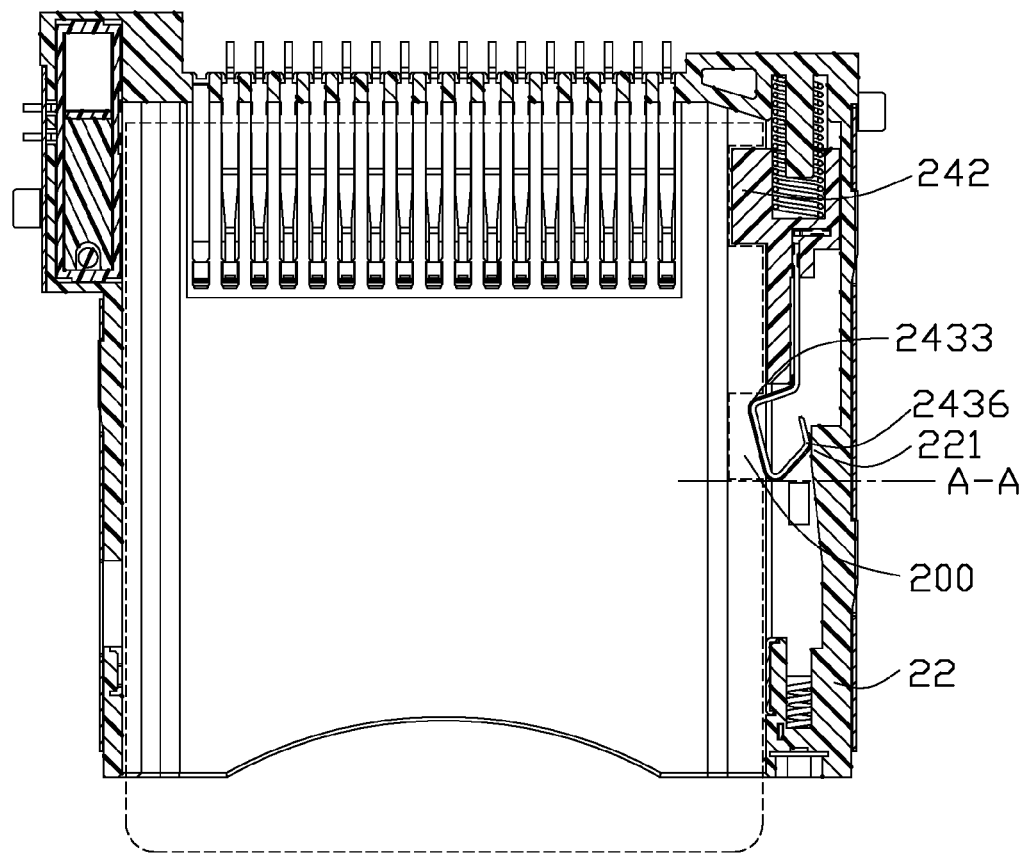
FIG. 8 is a cross-sectional view of the electrical card connector with the card inserted thereinto at a card locking position.

When the card is inserted into the card receiving space 10, the guiding portion 2434 is directly engaged by the card. The locking arm 243 is driven to be outwardly deformed so that the hook 2433 can protrude into a notch 200 of the card. With further insertion of the card, the card resists against the protrusion 2421 and moves simultaneously with the slider 242 along the card insertion direction. The first elastic member 241 is compressed. When the card is fully inserted into the card receiving space 10 to reach a card locking position where a rearmost point of the engaging portion 2435 is generally at position A-A as shown in FIG. 8, the other end of the link rod 244 stops at a locking location of the heart-shaped cam 2424. Under this condition, the card and a corresponding device are making data transmissions and the card is needed to be kept in the card receiving space 10. As shown in FIG. 8, according to the embodiment of the present invention, even if an external force is applied to pull the card, the card can not be extracted from the electrical card connector 100 via the support portion 2436 resisting against an inner block 221 of the right side wall 22. As a result, the card can be well protected.

Figure 9:
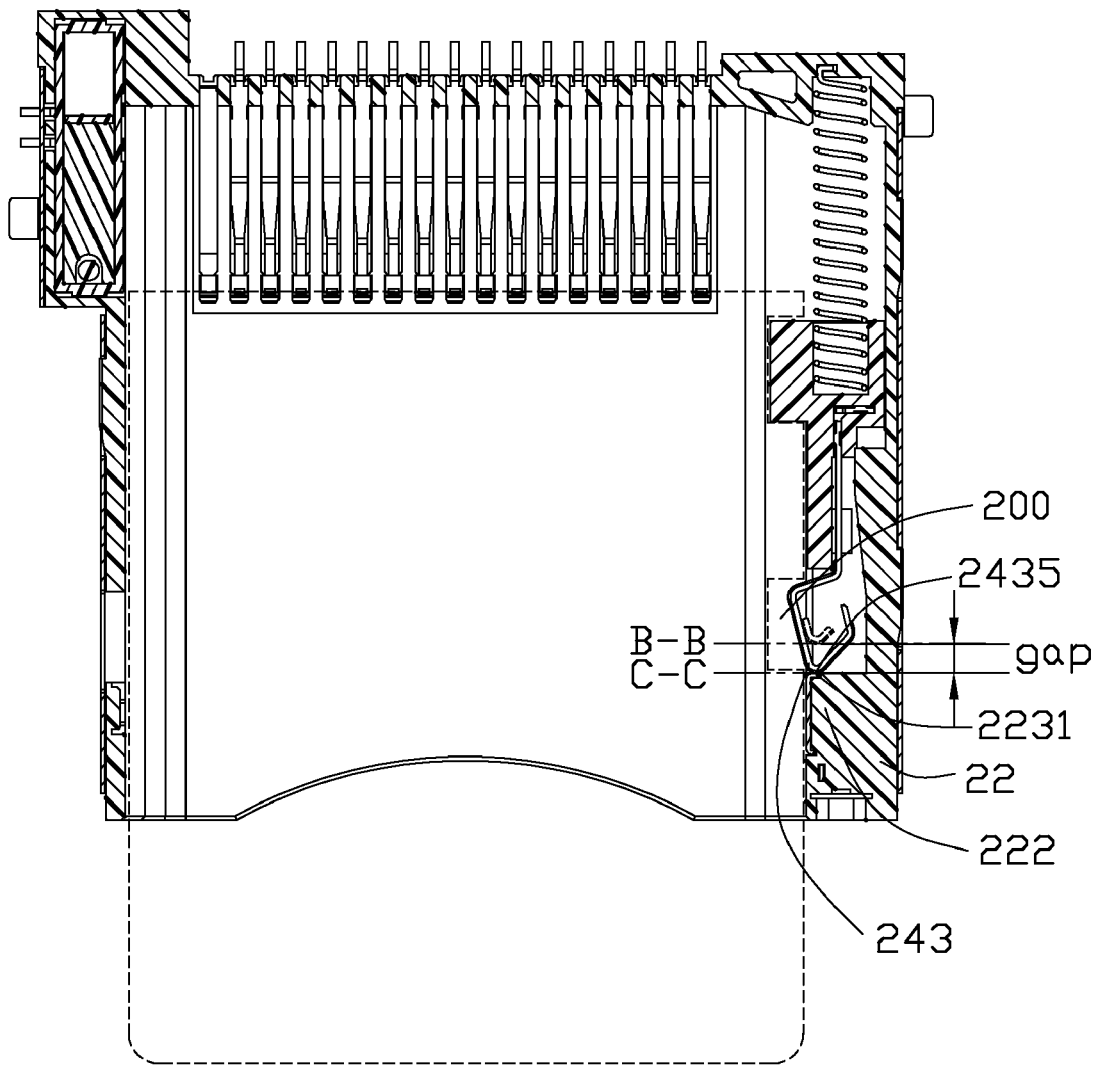
FIG. 9 is a cross-sectional view of the electrical card connector according to an alternative embodiment of the present invention showing the card ejected past a card release position and ultimately stopping at a card release position.

When the card is needed to extract from the card receiving space, a further insertion of the card is required. The first elastic member 241 release its elasticity and drive the card slidable along the card extraction direction. Under such process, two circumstances are needed to be analyzed. In a first circumstance, when the card is ejected under a normal speed, the card can stably reach a card release position where the rearmost point of the engaging portion 2435 is generally at position B-B as shown in FIG. 9. At this card release position, a gap is formed between the rearmost point of the engaging portion 2435 and a frontmost portion (corresponding to a position where the rearmost point of the engaging portion 2435 is generally at position C-C as shown in FIG. 8) of the front portion 2231 of the metal piece 223 in the preferred embodiment, or more generally a frontmost portion of the stop member 222 whether the metal piece 223 as part of the stop member 222 is present or not, along the card insertion or extraction direction. According to the embodiment of the present invention, the force of the second elastic member 246 is much larger than the force of the first elastic member 241 and an external pull force, so that the gap can be maintained. The locking arm 243 is outwardly deformable to disengage the hook 2433 from the notch 200 of the card. In a second circumstance, if the further insertion force for driving the card disappears abruptly, the card may extract at a much higher speed. Under this condition, if no protect is set in the electrical connector 100, the card might define over the hook 2433 and fly off the card receiving space 10. However, according to the present invention, even if the card is ejected under an abnormal speed faster than the normal speed, the slider 242 is ejected to the (rearmost) position C-C past the card release position B-B as shown in FIG. 9 where the engaging portion 2435 is restricted by the metal piece 223 to prevent the hook 2433 from releasing the card, as shown in FIG. 4, because the engaging portion 2435 will abut against the stop member 222, momentarily creating a rotational moment on the hook 2433 about the connecting portion 2432 which is counter to disengagement of the locking arm 243 from the notch 200. The block 2423 of the slider 242 temporarily slides into the second slot 2202 and compresses the second elastic member 246. Ultimately, under the joint driving of the first and the second elastic members 241, 246, the slider 242 stops at the card release position B-B where the locking arm 243 can be outwardly deformed to disengage the hook 2433 from the notch 200 of the card.

As shown in FIG. 9, an alternative embodiment without the second elastic member 246 is disclosed. Under this condition, the first elastic member 241 includes one end fixed to the insulative housing 2 and the other end fixed to the front thicker portion 2426 of the slider 242. That is to say, under any status, the first elastic member 241 is connected with the insulative housing 2 and the slider 242. When the card is ejected under a normal speed, the card can stably reach the card release position B-B where the first elastic member 241 is in a free status for example. Under this condition, a gap is formed between the engaging portion 2435 and the front portion 2231 of the metal piece 223 so that the locking arm 243 is outwardly deformable to disengage the hook 2433 from the notch 200 of the card.

As shown in FIG. 9, in another circumstance, if the further insertion force for ejecting the card disappears abruptly, the card may extract at a much higher speed. Under this condition, if no protect is set in the electrical connector 100, the card might define over the hook 2433 and fly off the card receiving space 10. However, according to the alternative embodiment of the present invention, even if the card is ejected under an abnormal speed faster than the normal speed, the slider 242 is ejected to the position C-C past the card release position B-B where the engaging portion 2435 is restricted by the metal piece 223 to prevent the hook 2433 from releasing the card. Under this condition, the first elastic member 241 is in an temporary extension status. Ultimately, under the recovery of the first elastic member 241, the slider 242 stops at the card release position B-B where the locking arm 243 can be outwardly deformed to disengage the hook 2433 from the notch 200 of the card.

It is to be understood, however, that even though numerous, characteristics and advantages of the present invention have been set forth in the foregoing description, together with details of the structure and function of the invention, the disclosed is illustrative only, and changes may be made in detail, especially in matters of number, shape, size, and arrangement of parts within the principles of the invention to the full extent indicated by the broadest general meaning of the terms in which the appended claims are expressed.

What is claimed is:

1. An electrical card connector comprising:
an insulative housing defining a card receiving space and a side wall located at a lateral side of the card receiving space;
a plurality of contacts retained in the insulative housing with contacting portions extending into the card receiving space for mating with a card;
a push-push mechanism comprising a slider slidably mounted in a first slot of the side wall, an elastic member received in the first slot for driving the slider and a locking arm fixed to the slider, the locking arm comprising a hook protruding into the card receiving space, the slider being slidable linearly along a card insertion or extraction direction; and
a stop member for mating with the locking arm; wherein
(i) the hook locks with a notch of the card when the card is fully inserted into the card receiving space at a card locking position;
(ii) when the card is ejected to a card release position, the locking arm is outwardly deformable to disengage the hook from the notch; and
(iii) in case the card is abruptly ejected past the card release position along the card extraction direction, the locking arm is restricted by the stop member to temporarily prevent the hook from releasing the card, and subsequently the card returns to the card release position along the card insertion direction.

2. The electrical card connector as claimed in claim 1, wherein the stop member is integrally formed on the side wall.

3. The electrical card connector as claimed in claim 1, wherein the stop member comprises a metal piece fixed to the side wall, the locking arm being restricted by the metal piece to prevent the hook from releasing the card when the card is ejected past the card release position.

4. The electrical card connector as claimed in claim 3, wherein the metal piece comprises a front portion for restricting the locking arm and a side portion exposed to the card receiving space for guiding the card.

5. The electrical card connector as claimed in claim 1, wherein the push-push mechanism comprises another elastic member and the side wall defines a second slot communicating with the first slot to receive the another elastic member, the another elastic member being compressed by the slider when the slider is ejected past the card release position.

6. The electrical card connector as claimed in claim 5, wherein the second slot extends through a rear end of the side wall, the another elastic member being a coiled spring which is inserted into the second slot along a card insertion direction, the electrical card connector further comprising a clip for limiting the another elastic member to prevent the another elastic member extracting from the second slot.

7. The electrical card connector as claimed in claim 6, wherein the elastic member and the another elastic member jointly drive the slider to finally stop at the card release position.

8. The electrical card connector as claimed in claim 6, wherein the first slot and the second slot are communicated with each other via a third slot formed on the side wall, the third slot being narrower than the first slot, the another elastic member being exposed to the third slot for being engaged by a block formed on a bottom side of the slider.

9. The electrical card connector as claimed in claim 1, wherein the locking arm comprises a retaining portion fixed to the slider, an inclined guiding portion extending from the hook for guiding insertion of the card, and an engaging portion formed on a rearmost end thereof for abutting against the stop member.

10. The electrical card connector as claimed in claim 9, wherein at the card release position a gap is formed between a rearmost point of the engaging portion and a frontmost portion of the stop member along the card extraction direction; and wherein when the card is ejected past the card release position, the engaging portion abuts against the stop member to create a rotational moment on the hook counter to disengagement of the locking arm from the notch of the card.

11. An electrical card connector comprising:
an insulative housing defining a card receiving space and a side wall located at a lateral side of the card receiving space;
a plurality of contacts with contacting portions extending into the card receiving space for mating with a card;
a push-push mechanism comprising a slider slidably mounted on the side wall, an elastic member for driving the slider along a card insertion/extraction direction and a locking arm fixed to the slider, the slider being slidable linearly along the card insertion/extraction direction, the locking arm comprising a hook protruding into the card receiving space for locking the card, an inclined guiding portion extending from the hook for guiding insertion of the card and a support portion bent outwardly and forwardly from the guiding portion; and
a stop member for mating with the locking arm; wherein
(i) the hook locks with a notch of the card when the card is fully inserted into the card receiving space at a card locking position, and the support portion resists against the side wall to prevent the card from withdrawing from the card receiving space if pulling out the card under such card locking position; and
(ii) when the slider is abruptly pushed by the elastic member along the card extraction direction past a card release position, the locking arm is restricted by the stop member to prevent releasing the card.

12. The electrical card connector as claimed in claim 11, wherein the push-push mechanism comprises another elastic member, the side wall defining a first slot to receive the elastic member and the slider and a second slot communicating with the first slot to receive the another elastic member, the another elastic member being compressed by the slider when the slider is ejected past the card release position.

13. The electrical card connector as claimed in claim 12, wherein the slider is driven to ultimately stop at the card release position jointly by the elastic member and the another elastic member.

14. The electrical card connector as claimed in claim 12, wherein the first slot and the second slot are communicated with each other via a third slot formed on the side wall, the third slot being narrower than the first slot, the another elastic member being exposed to the third slot for being engaged by a block formed on a bottom side of the slider.

15. The electrical card connector as claimed in claim 12, wherein the locking arm comprises an engaging portion formed on a rearmost end thereof for abutting against the stop member.

16. The electrical card connector as claimed in claim 15, wherein at the card release position a gap is formed between a rearmost point of the engaging portion and a frontmost portion of the stop member along the card extraction direction so that the locking arm is outwardly deformable to release the card.

17. An electrical card connector for use with an electronic card having a notch in one side, comprising:
an insulative housing;
a metallic shell assembled to the housing and cooperating with the housing to define a receiving space therebetween in a vertical direction;
a plurality of contacts disposed in the housing with contacting sections extending into the receiving space;
an ejection mechanism for ejection of the card, including:
a slider generally back and forth moveable along a front-to-back direction with regard to the housing and equipped with a hook thereon for locking into the notch of the electronic card, said slider defining a locking position with regard to the housing where the hook is unable to move for unlocking the card and thus the card is securely locked by the hook and is essentially well mated with the contacts, a release position located behind the locking position in the front-to-back direction, where the card is unmated with the contacts and is tenderly locked by the hook while being able to be unlocked via an external withdrawal force applied thereon to have the hook disengaged therefrom, and a rearmost position located behind the release position in the front-to-back direction, where via a stop member the hook is unable to move for unlocking the card and thus the card is is securely locked by the hook while being unmated with the contacts; and
a spring device providing a rearward force and essentially urging the slider back to the release position at least when the slider is moved between the release position and the locking position.

18. The electrical card connector as claimed in claim 17, wherein additional resilient force is applied to the slider to urge the slider back to the release position when said slider is moved between the release position and the rearmost position.

19. The electrical card connector as claimed in claim 18, wherein said additional resilient force is provided by another spring device which is discrete from said spring device.

20. The electrical card connector as claimed in claim 17, wherein a locking arm is associated with the slider and the hook is formed on the locking arm under condition that the slider moves only back and forth along the front-to-back direction without tilting while the locking arm is outwardly deflectable for unlocking the electronic card when the slider is moved to the release position.

* * * * *